(12) United States Patent
Mane et al.

(10) Patent No.: US 9,809,706 B2
(45) Date of Patent: Nov. 7, 2017

(54) RACEMIC DRUG RESOLUTION USING POLYMER SUPPORTED CHIRAL SELECTOR

(71) Applicant: Council of Scientific & Industrial Research, New Delhi (IN)

(72) Inventors: Sachin Tanaji Mane, Pune (IN); Siona Virgil Daniels, Pune (IN); Sarika Babasaheb Deokar, Pune (IN); Smita Atmaram Mule, Pune (IN); Surendra Ponrathnam, Pune (IN); Nayaku Nivrati Chavan, Pune (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 0 days.

(21) Appl. No.: 14/915,326

(22) PCT Filed: Sep. 1, 2014

(86) PCT No.: PCT/IN2014/000561
§ 371 (c)(1),
(2) Date: Feb. 29, 2016

(87) PCT Pub. No.: WO2015/029072
PCT Pub. Date: Mar. 5, 2015

(65) Prior Publication Data
US 2016/0208088 A1 Jul. 21, 2016

(30) Foreign Application Priority Data

Aug. 30, 2013 (IN) .......................... 2570/DEL/2013

(51) Int. Cl.
| | |
|---|---|
| *B01J 20/22* | (2006.01) |
| *B01J 20/26* | (2006.01) |
| *B01J 20/281* | (2006.01) |
| *C08L 33/12* | (2006.01) |
| *C08L 33/14* | (2006.01) |
| *C08L 47/00* | (2006.01) |
| *C08F 2/18* | (2006.01) |
| *C08F 220/14* | (2006.01) |
| *C08F 8/14* | (2006.01) |
| *C08F 8/30* | (2006.01) |
| *C08L 33/06* | (2006.01) |
| *C08F 120/32* | (2006.01) |
| *C08F 226/10* | (2006.01) |

(52) U.S. Cl.
CPC .............. *C08L 33/14* (2013.01); *B01J 20/22* (2013.01); *B01J 20/261* (2013.01); *B01J 20/267* (2013.01); *B01J 20/281* (2013.01); *C08F 2/18* (2013.01); *C08F 8/14* (2013.01); *C08F 8/30* (2013.01); *C08F 220/14* (2013.01); *C08L 33/06* (2013.01); *C08L 33/12* (2013.01); *C08L 47/00* (2013.01); *C08F 120/32* (2013.01); *C08F 226/10* (2013.01)

(58) Field of Classification Search
CPC .. C08F 2/18; C08F 220/14; C08F 8/14; C08F 261/02; C08F 8/30; C08F 120/32; C08F 226/10; C08L 33/06; C08L 33/12; C08L 33/14; C08L 47/00; B01J 20/22; B01J 20/261; B01J 20/267; B01J 20/281
See application file for complete search history.

(56) References Cited

U.S. PATENT DOCUMENTS

2004/0241753 A1    12/2004  Meier et al.
2015/0087784 A1 *   3/2015  Weber ..................... C08L 51/04
                                                    525/66

FOREIGN PATENT DOCUMENTS

| CN | 1879959 | 12/2006 |
| EP | 0146329 | 6/1985 |
| WO | WO 96/11894 | 4/1996 |
| WO | WO 2004/085485 | 10/2004 |
| WO | WO 2011/143524 | 11/2011 |
| WO | WO-2013104528 A1 * | 7/2013 |

OTHER PUBLICATIONS

Machine translation of CN1879959 Jan. 23, 2017.*
Lin et al. Journal of Applied Polymer Science vol. 70 (Dec. 1998) pp. 2313-2322.*
International Search Report dated Apr. 8, 2015, issued in PCT/IN2014/000561.

* cited by examiner

*Primary Examiner* — Irina S Zemel
*Assistant Examiner* — Jeffrey Lenihan
(74) *Attorney, Agent, or Firm* — Seyfarth Shaw LLP (57) ABSTRACT

The present invention relates to a process for the separation of enantiomers or resolution of racemic mixtures using high surface area core-shell polymer beads. The present invention further relates to a core-shell functionalized polymer comprising a core which comprises copolymer made from monomers selected from non-aromatic acrylate, ethylene dimethacrylate and divinyl-benzene, a shell which comprises monomers selected from glycidyl ethers of methacrylate and a chiral selector selected from tartaric acid derivatives and amino acids.

15 Claims, 6 Drawing Sheets

Scheme: 1

Methyl methacrylate + Ethylene dimethacrylate → Poly(MMA-co-EDMA)

Scheme: 2

Methyl methacrylate + Divinylbenzene → Poly(MMA-co-DVB)

Scheme: 3

Glycidyl methacrylate → Poly(GMA)

Fig. 13

Scheme: 4

Poly(MMA- co-DVB)   Poly(GMA)   Adsorption of poly(GMA) in porous poly(MMA-co-DVB)   Core-shell polymer Scheme: 5

Core-shell polymer    D-(-)-DTTA/DBTA    Core-shell polymer supported D-(-)-DTTA/DBTA Scheme: 6

Core-shell polymer    L-proline    Core-shell polymer supported L-proline

Fig. 14

RACEMIC DRUG RESOLUTION USING POLYMER SUPPORTED CHIRAL SELECTOR

FIELD OF THE INVENTION

The present invention relates to a process for the separation of enantiomers or resolution of racemic mixtures using high surface area core-shell polymer beads. Particularly, the present invention relates to a core-shell functionalized polymer beads comprising a core which comprises copolymer made from monomers selected from non-aromatic acrylate, ethylene dimethacrylate and divinylbenzene, a shell which comprises monomers selected from glycidyl ethers of methacrylate and a chiral selector selected from tartaric acid derivatives and amino acids and its use in the separation of enantiomers or resolution of racemic mixtures.

BACKGROUND AND PRIOR ART OF THE INVENTION

Resolution of racemic compounds is becoming an increasingly important industrial function for the last several years. This is because the resolved compounds, the optically active D or L isomers, have valuable utility and applications in fields such as drugs, fragrances, electronics and the like. Particularly in the pharmaceutical field there is a great interest in optically active isomeric forms of drugs. See for example Chiral Drugs, S. C. Stinson, Chemical and Engineering News, American Chemical Society, Washington, D.C., 44 (Oct. 9, 1995); idem, ibid., 38 (Sep. 27, 1993); and Chiral Drugs fast entering the Mainstream, Chemical Marketing Reporter, 5 (Jun. 10, 1996).

Obtaining optically active (chiral) isomeric forms of compounds has been traditionally achieved by processes such as chiral synthesis, asymmetric hydrogenation of appropriate precursors, enzymatic resolution, chromatic processes, and the like. However, such traditionally available synthetic methods to resolve racemates generally involve complicated or selective chemical reactions which necessitate a subsequent reverse reaction to yield the desired enantiomer; many of them are expensive and the yields are not always satisfactory. The enzymatic processes are generally slow. Since most chemical reactions result in the formation of racemates, an economical approach to resolving such readily available racemates would be the cheapest and easiest way to obtain chiral isomers.

Pasteur discovered the property of optical activity displayed by chiral compounds, the resolution of racemic mixtures into their enantiomeric components has posed a challenge. Substantial progress in separating enantiomeric pairs has been achieved since Pasteur's laborious hand separation method of the enantiomeric crystals of racemic sodium ammonium tartarate.

A traditional method of resolution comprises by reacting a racemic mixture with a second optically active substance to form a pair of diastereoisomeric derivatives. Such derivatives generally have different physical properties which permit their separation by conventional means. For example, fractional crystallization often permits substantial separation to afford at least one of the diastereoisomer in a pure state. An appropriate chemical transformation then converts the purified derivative, which was formed initially solely to prepare a diastereomeric pair, into one enantiomer of the originally racemic compound. Such traditional methods suffer from many limitations. Generally, only one of the enantiomeric pairs can be obtained, so yields are necessarily less than 50%. The separation of materials so obtained usually is not completed; leading to materials with enhanced rather that complete optical activity. The optically active materials used for the diastereoisomers frequently are expensive, toxic and partially recoverable.

Article titled "Chiral separation of binaphthol enantiomers on molecularly imprinted polymer monolith by capillary electro-chromatography" by Z S Liu et al. published in Anal Sci. 2004 April; 20(4):673-8 reports a novel enantioseparation monolithic stationary phase for binaphthol based on a molecular imprinting method was introduced and evaluated in capillary electrochromatography (CEC). The monolithic stationary was prepared by the in situ copolymerization of methacrylic acid and ethylene dimethacrylate in a porogenic solvent (toluene or toluene-isooctane) in the presence of an imprinting molecule, (R)-1,1'-bi-2,2'-naphthol. Such stationary phases could separate the enantiomers of binaphthol. The influence of the polymerization condition and the electrochromatographic parameters on the enantiomer separation was also studied. Initial studies showed that a higher molecular ratio of the imprinted molecule to the functional monomer, a higher content of porogen, a higher content of acetonitrile, a higher pH, as well as the addition of Tween 20, gave higher enantiomer selectivity.

Article titled "Tartaric acid derivatives as chiral selectors in liquid chromatography" by E. Heldin et al. published in Chromatographia, November 1991, 32 (9-10), pp 407-416 reports direct separation of enantiomeric amino-alcohols using tartaric acid derivatives as chiral complexing agents in organic stationary or mobile phases is described. Among the tartaric acid derivatives studied, only tartrates having hydroxyl groups attached to the asymmetric carbon atoms (C2) and (C3) free, gave enantioselective retention for epherrine stereoisomers. (2R, 3R)-di-n-butyl tartrate (DBT) dissolved in n-hexane as stationary liquid phase gave higher stereoselectivity than DBT in dichloromethane. Both hydrophilic (Nucleosil CN) and hydrophobic (porous graphitic carbon) solid supports were found to affect the retention and enantioselectivity when using a chiral liquid stationary phase.

PCT Patent application No. WO1996011894 discloses a process for separating enantiomers from a racemic mixture by countercurrent extraction using at least two substances, one of them a liquid in which the racemic mixture to be separated is present, the other containing a chiral adjuvant which is combined with or part of a gel forming substance in the form of discrete particles in a liquid separated from the counter currently flowing liquid containing the racemate to be separated by a microporous membrane having a pore size such that the pores can no longer be penetrated by the gel forming particles separated on conclusion of the extraction, followed by the setting free therefrom of one of the enantiomers under the influence of a stimulus, after which the particles are re-incorporated into the extracting process if so desired.

E.P. Patent No. 656919 discloses MMA-DVB copolymers suitable for use in making polymeric adsorbents for ion-exchange resins. Novel porous copolymers are disclosed which can be used to prepare ion-exchange resins and polymeric adsorbents. The copolymers comprise a copolymer of at least one monovinylidene monomer and a cross-linking monomer and have a unique cellular pore structure. The cellular structure comprises a macroporous void phase which is dispersed within a continuous copolymer phase.

U.S. Pat. No. 5,461,175 discloses a method for separating enantiomers of derivatives of aryloxipropanolamines is disclosed. In the method, the derivative is contacted with a chiral solid-phase chromatography material containing molecular imprints of an optically pure enantiomer of the derivative to be separated. A chiral solid-phase chromatography material for use in the method is also disclosed. This material consists of a polymer prepared by polymerization of a monomer in the presence of a crosslinking agent and of an optically pure enantiomer of the derivative to be separated, a molecular imprint of the optically pure enantiomer being formed in the polymer by non-covalent interactions between the monomer and the optically pure enantiomer. Moreover, the invention disclosed the use of the molecular imprinting method for preparing a chiral solid-phase chromatography material for use in the method.

U.S. Pat. No. 6,709,597 discloses a process for the separation of racemic mixtures comprising development of a denser molecular imprint on silica with a desired enantiomer by sol-gel protocol. More particularly, nanoporous silica with a defined shape and size is developed by molecular imprinting of the desired enantiomer for the resolution of corresponding racemic mixture.

U.S. Pat. No. 5,994,560 discloses a novel process to resolve a racemic compound into its optically active isomers without need for chemical transformation such as salt formation. The process advantageously utilizes polymers containing chiral moieties in their repeat units as well as exhibiting critical solution temperature behavior in a suitable solvent.

The literature survey shows that the chiral component was introduced in polymer backbone directly by adding as co-monomer, due to this direct insertion in to polymer backbone most of the chiral functional groups were buried, resulting lower enantiomeric excess separation. It is, therefore, an object of this invention to provide a viable process to resolve racemates into optically isomers.

OBJECT OF THE INVENTION

The main object of the present invention is to provide a process for the separation of enantiomers or resolution of racemic mixtures using high surface area core-shell functionalized polymer beads.

Another object of the present invention is to provide a core-shell functionalized polymer beads comprising a core which comprises copolymer made from monomers selected from non-aromatic acrylate, ethylene dimethacrylate and divinylbenzene, a shell comprising a polymer made from monomers selected from glycidyl ethers of methacrylate and a chiral selector selected from tartaric acid derivatives and amino acids.

SUMMARY OF THE INVENTION

Accordingly, present invention provides a core-shell functionalized polymer comprising:
i. A core comprising a crosslinked copolymer made from monomers, said monomers selected from non-aromatic acrylate, ethylene dimethacrylate and divinylbenzene and:
ii. A shell, comprising a polymer made from monomers selected from glycidyl ethers of methacrylate and
iii. A chiral selector selected from tartaric acid derivatives and amino acids.

In an embodiment of the present invention, the proportion of shell polymer is 5 to 90% by weight based on the total amount of the monomers of the core copolymer.

In another embodiment of the present invention, the core comprises crosslinked copolymers selected from poly(MMA-co-DVB) and poly(MMA-co-EDMA).

In yet another embodiment of the present invention, glycidyl ethers of methacrylate is glycidyl methacrylate.

In yet another embodiment of the present invention, the core-shell functionalized polymer is in the form of beads.

In yet another embodiment of the present invention, chiral selectors are selected D-(−)-ditoluoyl tartaric acid and D-(−)-dibenzoyl tartaric acid and amino acid is L-proline.

In yet another embodiment, present invention provides a process for the preparation of core-shell functionalized polymer as claimed in claim 1, comprising the steps of
a) providing porous crosslinked copolymer by known method;
b) providing linear polymer containing oxiranyl group by known method;
c) adding crosslinked copolymer with linear polymer in the ratio ranging between 0.3 to 0.7 wt % . . . at temperature in the range of 20 to 40° C. for period in the range of 10 to 20 min followed by drying at temperature in the range of 50 to 80° C. for period in the range of 6 to 10 h to obtain epoxy coated polymer; Partial crosslinking of oxiranyl groups present on the polymer of step (c) with amine groups to obtain epoxy groups and adding crosslinker 1,6-hexamethylene diamine with poly(GMA) polymer in the ratio range of 3 to 7 mol % . . . at temperature in the range of 20 to 40° C. for period in the range of 10 to 20 min followed by drying at temperature in the range of 40 to 80° C. for period in the range of 6 to 10 h to obtain core-shell polymer.
d) Modification of epoxy groups of polymer of step (c) with 1 to 2 mmol/g chiral tartaric acid/L-proline derivatives to obtain core-shell functionalized polymer.

In yet another embodiment of the present invention, said polymer is useful for the separation or resolution of enantiomers of racemic mixtures by using high performance liquid chromatography.

In yet another embodiment of the present invention, efficiency of chiral selectors is in the range of 20 to 70% in the period of 2 to 50 h.

In yet another embodiment of the present invention, the racemic mixture is drug racemic mixture selected from the $\beta_2$-adrenergic receptor agonist drugs especially (±)-terbutaline and (±)-salbutamol.

List of abbreviations are used in the present specification:
MMA: Methyl methacrylate;
EDMA: Ethylene dimethacrylate;
DVB: Divinylbenzene;
PVP: Poly(vinylpyrrolidone);
GMA: Glycidyl methacrylate;
AIBN: 2,2'-Azobisisobutyronitrile
MDD-200: MMA-DVB-1,2-dichlorobenzene at 200% crosslink density
MET: MMA-EDMA-1,1,2,2-tetrachloroethane
MED: MMA-EDMA-1,2-dichlorobenzene
MDT: MMA-DVB-1,1,2,2-tetrachloroethane
MDD: MMA-DVB-1,2-dichlorobenzene
Base: MDD-200 core polymer
BE: Poly(GMA) adsorbed MDD-200% core polymer
BED: Core-shell (5% crosslinked BE polymer)
BEDB: D-(−)-dibenzoyl tartaric acid supported core-shell polymer
BEDT: D-(−)-ditoluoyl tartaric acid supported core-shell polymer
BEDL: L-proline supported core-shell polymer

DETAILED DESCRIPTION OF THE INVENTION

The term core-shell morphology as employed herein means that the polymeric structure of the copolymer beads changes from the inside to the outside of the bead, accordingly. As used herein, the terms "core" and "shell" refer to the polymeric structure of the inside and the outside of the bead, respectively, and the use of said terms should not be constructed as meaning that the beads of this invention will exhibit a distinct interface between the polymers of the inside and outside of the bead.

The term "macroporous" refers to the fact that the copolymer has both macropores and micropores. The term "microporous" are well known in the art and generally describe the nature of the copolymer based porosity.

Present invention provides a process for the separation of enantiomers or resolution of racemic mixtures using high surface area core-shell functionalized polymer wherein the core and shell enhance the efficiency of hydrophilic as well as hydrophobic chiral resolution of drugs or separation of enantiomers.

The core acts as hydrophilic surface and shell act as hydrophobic surface for the resolution of racemic mixture or enantiomer separation of hydrophilic as well as hydrophobic enantiomer from the racemic mixture.

The present invention is useful for resolution of racemic drugs like (±)-terbutaline, (±)-salbutamol, (±)-ibuprofen, (±)-atanolol, (±)-metoprolol, (±)-amlodipine, (±)-cisapride, (±)-atorvastatin calcium, (±)-doxazosine mesylate, (±)-econazole nitrate, (±)-labetalol hydrochloride preferably, resolution of racemic drugs like (±)-terbutaline, (±)-salbutamol.

The process for separation of enantiomers or resolution of racemic mixture using core-shell functionalized polymer beads comprising the steps of:
  a. adding the racemic compound's solution in methanol, to chiral selector containing polymer synthesized above to obtain a mixture;
  b. analyzing the mixture obtained in step (a) using high performance liquid chromatography for enantiomeric excess of the racemic compound at different time intervals was analyzed to get the desired resolution.

The present invention provides a core-shell functionalized polymer beads comprising a copolymer core made from monomers selected from non-aromatic acrylate, ethylene dimethacrylate and divinylbenzene, a shell which comprises monomers selected from glycidyl ethers of methacrylate and a chiral selector selected from tartaric acid derivatives and amino acids.

In an aspect, the present invention provides a core-shell functionalized beads comprising a copolymer core made from monomers selected from non-aromatic acrylate, ethylene dimethacrylate and divinylbenzene, a shell comprising a polymer made from monomers selected from glycidyl ethers of methacrylate and a chiral selector selected from tartaric acid derivatives and amino acids.

The present invention provides core-shell polymers wherein the volume fraction of the core and shell can be varied depending up on the desired final properties of the particles.

The present invention provides core-shell functionalized polymer beads wherein the chiral resolution agent or chiral selector is selected from Tartaric acid derivatives [D-(−)-ditoluoyl/D-(−)-dibenzoyl tartaric acid tartaric acid], amino acid (L-proline) attached through epoxy functionality.

The core in core-shell polymer beads is synthesized via suspension polymerization comprising the steps of:
  a. adding the organic phase to the suspension reactor containing a colloid solution with constant stirring, wherein the said organic phase comprises of a mixture of non-aromatic acrylate monomers, crosslinker, free radical initiator and porogen;
  b. stirring the mixture of step (a) at a constant temperature for 3 h to complete the polymerization reaction and obtain the product in form of beads;
  c. work up followed by drying the product obtained in step (b) in the form of beads afforded the desired product.

In the synthesis of core of core-shell polymers via suspension polymerization wherein the temperature is in the range 50 and 130° C., preferably between about 70 to 100° C.

The free radicals are generated to initiate polymerization by the use of one or more mechanisms such as photochemical initiation, thermal initiation, redox initiation, degradative initiation, ultrasonic initiation, or the like.

The present invention provides the first stage polymerization, wherein the first core non-aromatic acrylate based monomer may be used in an amount of more than 90% by weight, preferably more than 95% by weight, based on total mass of the core forming monomers used in the first step polymerization and a second core monomer or crosslinking monomer may be used in an amount of not more than 10% by weight, and preferably not more than 5% by weight, based on total mass of the core forming monomers used in the first step polymerization.

The non-aromatic acrylate based monomer selected from ethyl acrylate, propyl acrylate, butyl acrylate, cyclohexyl acrylate, 2-ethyl hexyl acrylate, methyl acrylate, methyl methacrylate, or butyl methacrylate or a vinyl cyanide or vinylidene cyanide such as acrylonitrile or methacrylonitrile.

The crosslinker monomer selected from multi-ethylenically-unsaturated monomers useful in the present invention include di-, tri-, tetra- or higher multi-functional ethylenically unsaturated monomers such as, for example, trivinylbenzene, divinyltoluene, divinylpyridine, divinylnaphthalene and divinylxylene; and such as ethylene diacrylate, trimethylolpropane triacrylate, diethylene glycol divinyl ether, trivinylcyclohexane, allyl methacrylate (ALMA), ethylene dimethacrylate (EDMA), diethylene dimethacrylate (DEDM), propyleneglycol dimethacrylate, propyleneglycol diacrylate, trimethylolpropane trimethacrylate (TMPTMA), divinylbenzene (DVB), 2,2-dimethylpropane-1,3-diacrylate, 1,3-butylene glycol diacrylate, 1,3-butyleneglycol dimethacrylate, 1,4-butanediol diacrylate, diethylene glycol diacrylate, diethylene glycol dimethacrylate, 1,6-hexanediol diacrylate, 1,6-hexanediol dimethacrylate, tripropylene glycol diacrylate, triethylene glycol dimethacrylate, tetraethylene glycol diacrylate, polyethylene glycol 200 diacrylate, tetraethylene glycol dimethacrylate, polyethylene glycol dimethacrylate, ethoxylated bisphenol A diacrylate, ethoxylated bisphenol A dimethacrylate, polyethylene glycol 600 dimethacrylate, poly(butanediol) diacrylate, pentaerythritol triacrylate, trimethylolpropane triethoxy triacrylate, glyceryl propoxy triacrylate, pentaerythritol tetraacrylate, pentaerythritol tetramethacrylate, dipentaerythritol monohydroxypentaacrylate, divinyl silane, trivinyl silane, dimethyl divinyl silane, divinyl methyl silane, methyl trivinyl silane, diphenyl divinyl silane, divinyl phenyl silane, trivinyl phenyl silane, divinyl methyl phenyl silane, tetravinyl silane, dimethyl vinyl disiloxane, poly(methyl vinyl siloxane), poly (vinyl hydro siloxane), poly(phenyl vinyl siloxane) and mixtures thereof is used for the preparation of core polymer, because it makes polymer insoluble useful for separation of enantiomers or resolution of racemic mixture.

The present invention provides the first stage polymerization, wherein the diamines act as crosslinking agent in epoxy functionalized polymers and is selected from: 1,4-diamino-2,3,5,6-tetramethyl benzene, 1,4-diamino-2,3,5,6-tetraethyl benzene, 1,4-diamino-2,3,5,6-tetrapropyl benzene, 1,4-diamino-2,3,5,6-tetraisopropyl benzene, 1,4-diamino-2,3,5,6-tetrabutyl benzene, 1,4-diamino-2,3,5,6-tetrapentyl benzene, 1,4-diamino-2,3,5,6-tetrahexyl benzene, 1,4-diamino-2,3,5,6-tetraheptyl benzene, 1,4-diamino-2,3,5,6-tetraoctyl benzene, 1,4-diamino-2,3,5,6-tetranonyl benzene, 1,4-diamino-2,3,5,6-tetradecyl benzene, 1,4-diamino-2,3-diethyl-5,6-dimethyl benzene, 1,4-diamino-2,3-diethyl-3,6-dimethyl benzene, 1,4-diamino-2,3-diethyl-5,6-dimethyl benzene, 1,4-diamino-2-ethyl-3,5,6-trimethyl benzene, 1,4-diamino-3-ethyl-2,6-dimethyl-5-propyl benzene, 1,4-diamino-3-ethyl-2,5-dimethyl-6-propyl benzene and, 1,4-diamino-6-butyl-3-ethyl-2-methyl-5-propyl benzene. This may be used individually or in a combination of two or more of them.

The present invention provides core-shell functionalized polymers wherein the free radical generator, or initiator, or free radical forming agent, selected from azo-type initiators, peroxide initiators, or mixtures thereof and the initiator is introduced into the system either by itself or as an admixture with a solvent or monomer and preferably, already having been admixed with the first monomer.

The initiators can be peroxide type selected from diacyl peroxides, peroxy esters, peroxy ketals, di-alkyl peroxides, and hydroperoxides, specifically benzoyl peroxide, decanoyl peroxide, lauroyl peroxide, succinic acid peroxide, cumene hydroperoxide, t-butyl peroxy acetate, 2,2-di(t-butyl peroxy)butane di-alkyl peroxide, or cumyl peroxide, or mixtures thereof.

The initiator can be azo-type selected from azobisisobutyronitrile (AIBN), 2,2'-azobis(N,N'-dimethyeleneisobutyramide)dihydrochloride, (or VA-044 of Wako chemical Co.), 2,2-azobis(2,4-dimethyl valeronitrile), (or V-65 of Wako chemical Co.), 1,1-azobis(1-cyclohexanecarbonitrile), and acid functionalized azo-type initiators such as 4,4,-azobis (4-cyanopentanoic acid).

The chlorinated solvents is selected from tetrachloroethane, dichloroethane, chlorobenzene, dichlorobenzene, ethylene dichloride, methylene chloride as porogen in polymeric systems in styrene-divinylbenzene, methyl methacrylate-ethylene dimethacrylate, methyl methacrylate-divinylbenzene polymer systems to increase the porosity which are added during polymerization also nitrogen substituted aromatics, like nitrobenzene are applied as porogen to increase porosity. It is based on types of monomers used in polymer system.

The present invention provides the core polymer synthesis, wherein the colloids is selected from polyethylene oxide, starch and starch derivatives, gelatin, casein and other water-soluble proteins, water-soluble cellulose derivatives, hydroxy ethyl cellulose, polysaccharides, water-soluble polyacrylates, acrylic acid copolymers, ethylene oxide-propylene oxide copolymers, polyvinyl alcohol, acetalised polyvinyl alcohol.

The present invention provides a process for shell polymer synthesis, wherein the monomers used for the shell of the core-shell polymers is selected from glycidyl ethers of (meth)acrylate, (meth)acrylic amide, (meth)acrylic acid, maleic anhydride and like; 2-hydroxyethyl methacrylate (HEMA), 2-hydroxyethyl acrylate (HEA), 2-hydroxypropyl methacrylate, 1-methyl-2-hydroxyethyl methacrylate, 2-hydroxy-propyl acrylate, 1-methyl-2-hydroxyethyl acrylate, 2-hydroxybutyl methacrylate, 2-hydroxybutyl acrylate and mixtures thereof; HEMA, 1-methyl-2-hydroxyethyl methacrylate, 2-hydroxypropyl methacrylate and mixtures thereof;

The present invention provides a process for the shell polymer synthesis comprising the steps of:
a. adding monomer, free radical initiator to solvent to obtain the reaction mixture;
b. stirring the reaction mixture of step (a) at a constant temperature for 6 h to obtain the polymeric solution;
c. precipitating the polymeric solution of step (b) in methanol followed by filtration and drying afforded the desired product.

The present invention provides the difunctional chiral selectors in core-shell polymers and is selected from: D-(−)-Alanine, (R)-(−)-1-Amino-2-propanol, (S)-(+)-1-Amino-2-propanol, (RS)-1,1'-Bi-2-naphthol, (2R,3R)-(−)-2,3-Butanediol, (2S,3S)-(+)-2,3-Butanediol, (R)-(−)-2-Chloromandelic acid, (S)-(+)-2-Chloromandelic acid, trans-1,2-Diaminocyclohexane, (1R,2R)-(−)-1,2-Diaminocyclohexane, (1R,2R)-

(+)-1,2-Diphenylethylenediamine, (1S,2S)-(−)-1,2-Diphenylethylenediamine, (1S,2S)-(+)-1,2-Diaminocyclohexane, D-(+)-Malic acid, (R)-(−)-2-Methyl-2,4-pentanediol, S)-(+)-2-Methyl-2,4-pentanediol, D-Phenylalanine, (R)-(+)-1-Phenylethylamine, D-Serine, 2-amino butanol.

The present invention provides the chiral amino acid as selectors in core-shell polymers and is selected from: D-Isoleucine, L-allo-Isoleucine, D-allo-Isoleucine, D-tert-Leucine, L-Norvaline, D-Norvaline, (R)-β-phenylalanine, (S)-β-phenylalanine, (R)-s-(p-chlorophenyl)alanine, (S)-s-(p-chlorophenyl)alanine, (R)-s-(p-methylphenyl)alanine, (R)-β-(p-methoxyphenyl)alanine, (S)-β-(p-methoxyphenypalanine, (R)-3-Amino-3-(2-thienyl)-propionic acid, (S)-3-Amino-3-(2-thienyl)-propionic acid, (R)-3-Amino-3-(1-naphthyl)-propionic acid, (S)-3-Amino-3-(1-naphthyl)-propionic acid, argenine, asparagines, aspartic acid, cystein, glutamine, glutamic acid, glycine, histidine, isoleucine, lysine, methionine, phenyl alanine, proline, serine, threonine, tryptophan, tyrosine, glycylalanine, naphthyl glycine, phenyl glycine.

The chiral selectors are selected from tartaric acid derivatives and amino acids.

The present invention provides the polymer beads having a spherical morphology generally with large number of pores. The copolymer beads that can be microporous, i.e., gel in character, or microporous, depending upon the concentration of porogen. Microporous copolymers beads have pore sizes on the order of 0.05 µm or less, while macroporous copolymer beads have macropores of 0.150 µm or greater. Control of the size of the beads is achieved primarily by controlling the amount of monomers employed in the monomer feed. The copolymer beads can range in size, i.e. about 5 µm, to large beads having a diameter of 200 µm or more. Preferably, the size of the copolymer bead is in the range of 20 to 100 µm in diameter.

The present invention provides methyl methacrylate base/core polymer having specific surface area in the range of 50-600 m$^2$/g of dry resin.

The present invention provides the pore volume of the methyl methacrylate base/core polymer ranging from 0.5 to 1.5 cc/g and preferably, in the range of 0.7-1.3 cc/g of porosity.

The coating of core of core-shell polymers comprising the steps of:
  a. adding poly(GMA) solution in 1,4-dioxane, to the polymer beads and keeping the solution at room temperature for 24 h to obtain the polymeric solution;
  b. drying the polymeric solution of step (a) to obtain the desired coated core of the core-shell polymer.

The crosslinking of coated core of core-shell polymers comprising the steps of
  a. adding the crosslinker agent solution in methanol to a shell polymer obtained above and keeping the mixture for 30 h to get the crosslinked polymer;
  b. drying the crosslinked polymer obtained in step (a) to obtain the desired crosslinked polymer as product.

Crosslinking core can increase the hardness of the core, as well as enhance the uniformity and performance of the shape and size of the resultant polymer beads. The present invention provides a porous copolymer of at least one monovinylidene monomer and a crosslinking monomer present in an amount of from 0.3 to 5 weight percent based on total monomer weight, at least one free radical polymerization initiator in an amount of from 0.025 to 2 wt % percent based on the monomer weight, and a phase separating diluent present in an amount from 30 to 80 wt % of monomer at a temperature from 70 to 140° C.

The present invention provides a process for the synthesis of core-shell polymer wherein poly(MMA-co-DVB) can be used as core material and poly(GMA) as shell material. The process for the preparation of core-shell functionalized polymer comprising the following steps:
  a) Synthesis of porous crosslinked polymer (hydrophobic methacrylate/acrylate)
  b) Synthesis of linear polymer containing oxiranyl group
  c) Coating of polymer b) on polymer a)
  d) Partial crosslinking of oxiranyl groups present on the polymer backbone with amine groups
  e) Modification of epoxy groups with chiral tartaric acid/L-proline derivatives.

The temperature can be dependent on the initiator system used. In certain cases, the starting temperature is preferably about 70° C. The heat evaluation due to exothermic reaction during polymerization can be utilized in order to set the reaction temperature between 80 and 90° C. and optionally cooling may be necessary in order not to exceed the indicated temperature range. However, all the quantity of heat produced can be dissipated, so as to maintain the starting temperature of about 70° C. throughout the reaction or ever drop below it. In individual cases, it is even possible to work in an autoclave, which offers the possibility of carrying out polymerization at above 100° C.

A system which may be useful in the practice of the present invention includes a stirred tank reactor having a stirrer capable of providing agitation at 300 to 600 rpm; a temperature sensor/probe, a means of heating and cooling the reactor and its contents, and a controller to maintain or adjust the temperature of the reactor contents; a means of providing an inert gas in to the reactor, a reservoir for holding an admixture of one or more of solvents, monomer and initiator. The reactor may also be fitted with a reflux condenser. One of the skills in the art will be able to adapt the method of the present invention for use in other reactor systems including other batch reactor systems, semi-batch reactors, and tubular reactors.

The aforementioned core-shell morphology of the copolymer beads is detectable using various known techniques for determining the structure of polymeric materials. In general, one or more of the following analytical techniques, among others, can be suitably employed to determine the core-shell morphology the copolymer beads of the invention: dynamic thermal analysis, differential thermal analysis, osmium staining techniques, measurement of the respective refractive indices of the core and shell of the copolymer beads, conventional transmission electron microscopy, scanning electron microscopy and other suitable techniques.

EXAMPLES

Following examples are given by way of illustration and therefore should not be construed to limit the scope of the invention.

The equipment's used for characterization of core-shell polymers are presented below.

FTIR spectra were recorded on Perkin Elmer instrument. Model was Spectrum GX and serial number is 69229. Number of scans was 10 numbers with 4 cm$^{-1}$ resolution and 1 interval. Polymer surface area was determined by NOVA 2000e, Quantachrome instruments, Boynton, Fla.-33426. A commercial mercury porosimeter, Poremaster 60, manufactured by Quantachrome, was used for determination of specific pore volumes and pore size distribution. Average particle size was determined by Accusizer 780 (Model: LE 2500-20) PSS.NICOMP Particle sizing system, Santa Barbara, Calif., USA. Gel Permission Chromatography analysis was performed in chloroform using Viscotek 200+RALLS, Model-Viscotek model 250, Column-3X mix B. External morphology and particle size visualization was analyzed by scanning electron microscope Quanta 200 3D, dual beam ESEM microscope). Electron source was thermionic emission tungsten filament. $^{13}C$ NMR spectra of core-shell polymer and its modification with chiral selectors were recorded in adamantane ($C_{10}H_{16}$) as internal standard (JEOL-400 MHz). Enantiomeric excess was determined by high performance liquid chromatography (Alliance, Waters e2695 separations module) and detector was waters 2998 photodiode array detector. Epoxy content determined by HCl in dioxane method whereas acid content was determined by KOH in methanol method. Polymers purified by soxhlet extraction, dried in vacuum at 60° C. and were used for characterization.

Example 1: Synthesis of Poly(MMA-co-EDMA) and Poly(MMA-co-DVB) by Suspension Polymerization To a 1 lit double walled cylindrical glass reactor, 11 cm diameter and 15 cm height, equipped with a mechanical stirrer and thermostat, were slowly added organic phase comprises of 5.649 g (0.056 mol) methyl methacrylate, 1.836 g (0.014 mol) divinylbenzene, 0.290 g (2.5 mol %) AIBN, and 24 mL 1,1,2,2-tetrachloroethane (porogen) to aqueous phase consists of 5 wt % PVP in 100 mL deionised water with stirring (500 rpm) under nitrogen atmosphere. The polymerization was carried out at 70° C. for 3 h. The copolymer beads obtained were thoroughly washed with water, methanol and acetone, and were dried in oven at 60° C. under reduced pressure for 8 h. Synthesized copolymer was purified by solvent extraction using methanol, and was dried under reduced pressure at 60° C. for 8 h. The monomers feed composition used for the synthesis of copolymers poly(MMA-co-EDMA) and poly(MMA-co-DVB) is shown in Table 1. The concentration of monomer and crosslinker at different crosslink density were determined by following equation.

$$A = \frac{\text{Mol wt. of } M}{\text{Density of } M} X + \frac{\text{Mol wt. of } C}{\text{Density of } C} X\ CLD$$

Where, A: Batch size, M: Monomer, C: Crosslinker, CLD: Crosslink density, X: Determination factor.

TABLE 1

| Polymer | Units | Crosslink density (%) | | | | | |
| --- | --- | --- | --- | --- | --- | --- | --- |
| | | 25 | 50 | 75 | 100 | 150 | 200 |
| Poly(MMA-co-EDMA) | mol | 0.049: 0.015 | 0.042: 0.020 | 0.032: 0.024 | 0.027: 0.027 | 0.021: 0.031 | 0.017: 0.033 |
| | g | 4.921: 2.923 | 4.236: 3.955 | 3.234: 4.803 | 2.717: 5.379 | 2.086: 6.114 | 1.657: 6.561 |
| | AIBN | 0.268 | 0.246 | 0.232 | 0.224 | 0.211 | 0.204 |
| Poly(MMA-co-DVB) | mol | 0.056: 0.014 | 0.045: 0.022 | 0.037: 0.028 | 0.032: 0.032 | 0.025: 0.038 | 0.020: 0.041 |
| | g | 5.649: 1.836 | 4.515: 2.935 | 3.760: 3.667 | 3.222: 4.189 | 2.504: 4.884 | 2.048: 5.326 |
| | AIBN | 0.290 | 0.278 | 0.270 | 0.264 | 0.257 | 0.252 |

Reaction conditions: Batch size=8 mL, AIBN=2.5 mol %, stirring speed=500 rpm, reaction time=3 h, outer phase=$H_2O$, protective colloid=PVP, concentration of protective colloid=5%, porogen=24 mL (1:3 v/v), temp.=70° C.

Figure 13:
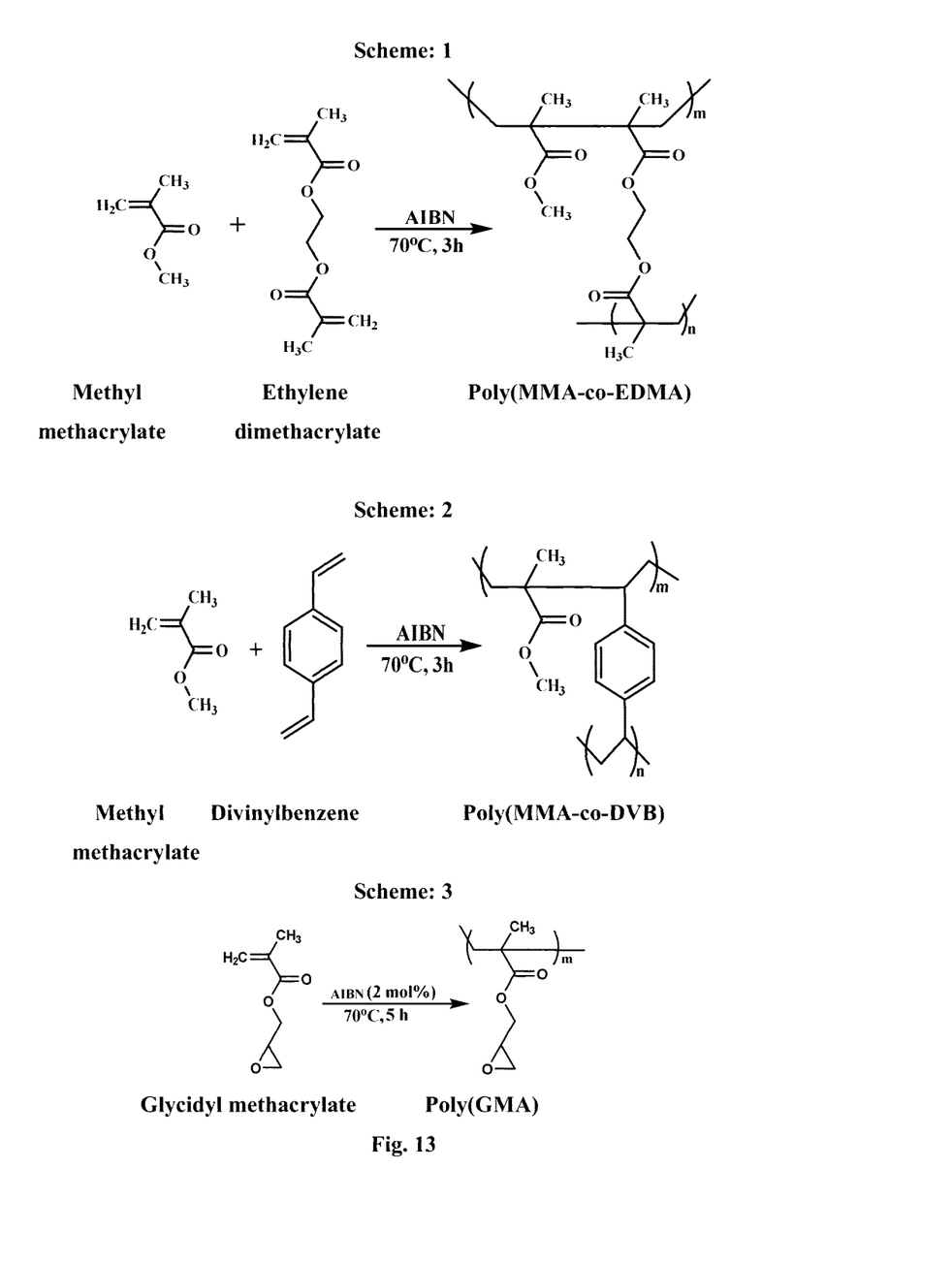
FIG. 13 depicts Scheme: 1 showing synthesis of poly (MMA-co-EDMA) by suspension polymerization; Scheme: 2 showing synthesis of poly(MMA-co-DVB) by suspension polymerization; and Scheme: 3 showing synthesis of poly (GMA) by solution polymerization.

Syntheses of poly(MMA-co-EDMA) and poly(MMA-co-DVB) by suspension polymerization are presented in FIG. 13, schemes 1 and 2, respectively. Furthermore, surface area of poly(MMA-co-EDMA) and poly(MMA-co-DVB) by suspension polymerization using different crosslink density is presented in Table 2.

Figure 1:
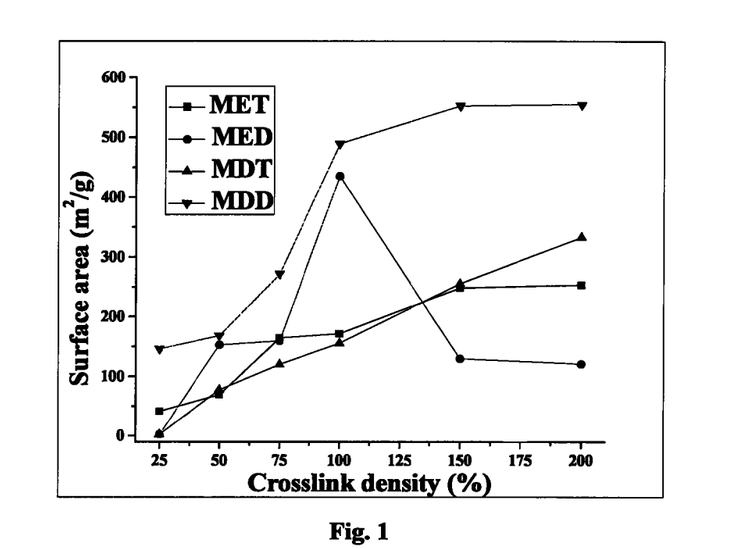
FIG. 1 depicts comparison of surface area of poly(MMA-co-EDMA) and poly(MMA-co-DVB) using different cross-link density, crosslinkers and porogens.
Figure 2:
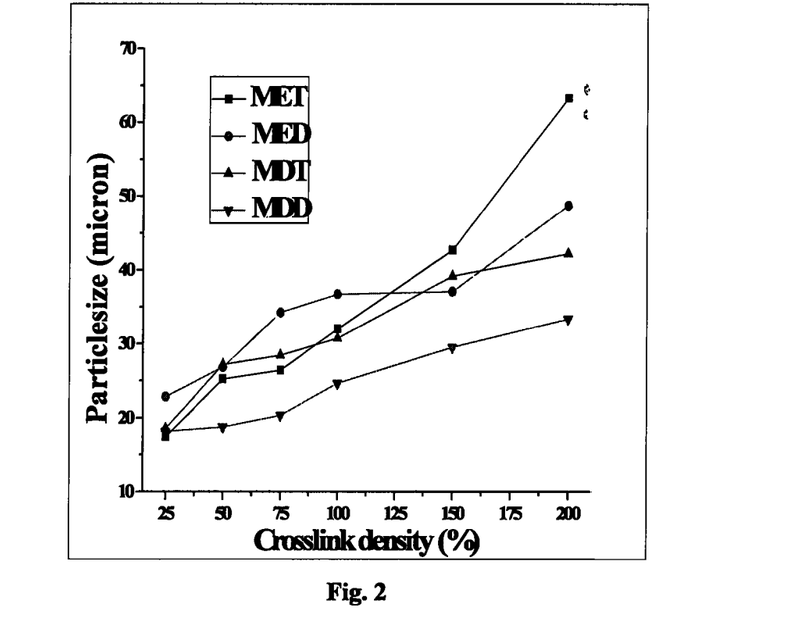
FIG. 2 depicts comparison of particle size of poly(MMA-co-EDMA) and poly(MMA-co-DVB) using different cross-link density, crosslinkers and porogens.

Comparison of porosity data, pore volume and pore diameter, of poly(MMA-co-EDMA) and poly(MMA-co-DVB) using porogens, 1,1,2,2-tetrachloroethane and 1,2-dichlorobenzene, is illustrated in Table 3. Particle size analysis data of poly(MMA-co-EDMA) and poly(MMA-co-DVB) by suspension polymerization is presented in Table 4. Comparison plots of surface area and particle size of poly (MMA-co-EDMA) and poly(MMA-co-DVB) by suspension polymerization is depicted in FIGS. 1 and 2 respectively.

TABLE 2

| | | Surface area expressed in $m^2/g$ | | | | | |
| --- | --- | --- | --- | --- | --- | --- | --- |
| | Polymer | Crosslink density (%) | | | | | |
| Copolymer | code | 25 | 50 | 75 | 100 | 150 | 200 |
| Poly(MMA-co-EDMA) | MET | 41.50 | 69.59 | 164.36 | 171.77 | 248.5 | 253.5 |
| | MED | 2.84 | 153.0 | 159.8 | 435.6 | 129.88 | 121.20 |
| Poly(MMA-co-DVB) | MDT | 2.82 | 77.70 | 120.04 | 155.6 | 255.6 | 333.2 |
| | MDD | 146.2 | 168.1 | 271.9 | 489.51 | 536.11 | 554.95 |

TABLE 3

| Polymer | | Crosslink density (%) | | | | | |
|---|---|---|---|---|---|---|---|
| code | Property | 25 | 50 | 75 | 100 | 150 | 200 |
| MET | Pore volume (cc/g) | 0.779 | 0.746 | 1.062 | 0.764 | 1.842 | 0.751 |
| | Pore diameter (μm) | — | 0.062 | 0.053 | 0.046 | 0.050 | 0.048 |
| | Porosity (%) | 52.37 | 50.85 | 59.54 | 44.97 | 64.78 | 55.06 |
| MED | Pore volume (cc/g) | 0.655 | 0.870 | 1.536 | 0.754 | 1.689 | 1.931 |
| | Pore diameter (μm) | 0.065 | 0.084 | 0.048 | 0.079 | 0.060 | 0.055 |
| | Porosity (%) | 50.48 | 52.65 | 68.06 | 60.00 | — | 62.21 |
| MDT | Pore volume (cc/g) | 0.545 | 0.732 | 1.516 | 0.918 | 0.801 | 0.839 |
| | Pore diameter (μm) | 0.052 | 0.044 | 0.052 | 0.074 | 0.041 | 0.041 |
| | Porosity (%) | 39.49 | 46.40 | 68.63 | 58.09 | 48.46 | 51.32 |
| MDD | Pore volume (cc/g) | 0.574 | 0.997 | 1.142 | 1.113 | 1.056 | 1.437 |
| | Pore diameter (μ) | 0.041 | 0.036 | 0.058 | 0.048 | — | 0.041 |
| | Porosity (%) | 39.44 | 55.51 | 57.58 | 53.04 | 41.99 | 64.85 |

TABLE 4

| | | Particle size expressed in μm | | | | | |
|---|---|---|---|---|---|---|---|
| | Polymer | Crosslink density (%) | | | | | |
| Copolymer | code | 25 | 50 | 75 | 100 | 150 | 200 |
| Poly(MMA-co-EDMA) | MET | 17.45 | 25.25 | 26.42 | 31.99 | 42.70 | 63.27 |
| | MED | 22.88 | 26.84 | 34.26 | 36.73 | 37.07 | 48.73 |
| Poly(MMA-co-DVB) | MDT | 18.60 | 27.21 | 28.45 | 30.75 | 39.17 | 42.21 |
| | MDD | 18.16 | 18.78 | 20.35 | 24.66 | 29.51 | 33.39 |

Example 1(a)

The suspension polymerization was carried out in a double walled cylindrical glass reactor maintained at a constant temperature, equipped with a condenser, nitrogen inlet and overhead stirrer with constant stirring. The oil phase comprising of 5.649 g (0.056 mol) methyl methacrylate, 1.836 g (0.014) divinylbenzene, 0.290 g (2.5 mol %) 2,2'-azobisisobutyronitrile and 24 mL 1,1,2,2-tetrachloroethane (porogen) were added to the suspension reactor containing 5 wt % of poly(vinylpyrrolidone) (protective colloid) dissolved in 100 mL distilled water with constant, stirring at speed of 500 rotations per minute. After complete addition of the oil phase to the aqueous phase, the temperature of the reactor was raised to 70° C. and maintained for 3 h to carry out the polymerization. On completion of the reaction time the product obtained in the form of beads was cooled, filtered and washed several times with water, methanol and dried in oven at 60° C. under reduced pressure for 8 h.

| Examples | CLD (%) | methyl methacrylate | divinylbenzene | 2,2'-azobisisobutyronitile | (porogen) |
|---|---|---|---|---|---|
| 1b | 25 | 5.649 g (0.056 mol) | 1.836 g (0.014) | 0.290 g (2.5 mol %) | 24 mL 1,2-dichlorobenzene |
| 1c | 50 | 4.515 g (0.045 mol) | 2.935 g (0.022 mol) | 0.278 g (2.5 mol %) | 24 mL 1,1,2,2-tetrachloroethane |
| 1d | | 4.515 g (0.045 mol) | 2.935 g (0.022 mol) | 0.278 g (2.5 mol %) | 24 mL 1,2-dichlorobenzene |
| 1e | 75 | 3.760 g (0.037 mol) | 3.667 g (0.028 mol) | 0.270 g (2.5 mol %) | 24 mL 1,1,2,2-tetrachloroethane |
| 1f | | 3.760 g (0.037 mol) | 3.667 g (0.028 mol) | 0.270 g (2.5 mol %) | 24 mL 1,2-dichlorobenzene |
| 1g | 100 | 3.222 g (0.032 mol) | 4.189 g (0.032 mol) | 0.264 g (2.5 mol %) | 24 mL 1,1,2,2-tetrachloroethane |
| 1h | | 3.222 g (0.032 mol) | 4.189 g (0.032 mol) | 0.264 g (2.5 mol %) | 24 mL 1,2-dichlorobenzene |
| 1i | 150 | 2.504 g (0.025 mol) | 4.884 g (0.038 mol) | 0.257 g (2.5 mol %) | 24 mL 1,1,2,2-tetrachloroethane |
| 1j | | 2.504 g (0.025 mol) | 4.884 g (0.038 mol) | 0.257 g (2.5 mol %) | 24 mL 1,2-dichlorobenzene |
| 1k | 200 | 2.048 g (0.020 mol) | 5.326 g (0.041 mol) | 0.252 g (2.5 mol %) | 24 mL 1,1,2,2-tetrachloroethane |
| 1l | | 2.048 g (0.020 mol) | 5.326 g (0.041 mol) | 0.252 g (2.5 mol %) | 24 mL 1,2-dichlorobenzene |
| 1m | 25 | 4.921 g (0.049 mol) | 2.923 g (0.015 mol) | 0.268 g (2.5 mol %) | 24 mL 1,1,2,2-tetrachloroethane |
| 1n | | 4.921 g (0.049 mol) | 2.923 g (0.015 mol) | 0.268 g (2.5 mol %) | 24 mL 1,2-dichlorobenzene |
| 1o | 50 | 4.236 g (0.042 mol) | 3.955 g (0.020 mol) | 0.246 g (2.5 mol %) | 24 mL 1,1,2,2-tetrachloroethane |
| 1p | | 4.236 g (0.042 mol) | 3.955 g (0.020 mol) | 0.246 g (2.5 mol %) | 24 mL 1,2-dichlorobenzene |
| 1q | 75 | 3.234 g (0.032 mol) | 4.803 g (0.024 mol) | 0.232 g (2.5 mol %) | 24 mL 1,1,2,2-tetrachloroethane |
| 1r | | 3.234 g (0.032 mol) | 4.803 g (0.024 mol) | 0.232 g (2.5 mol %) | 24 mL 1,2-dichlorobenzene |
| 1s | 100 | 2.717 g (0.027 mol) | 5.379 g (0.027 mol) | 0.224 g (2.5 mol %) | 24 mL 1,1,2,2-tetrachloroethane |

-continued

| Examples | CLD (%) | methyl methacrylate | divinylbenzene | 2,2'-azobisisobutyronitile | (porogen) |
|---|---|---|---|---|---|
| 1t | | 2.717 g (0.027 mol) | 5.379 g (0.027 mol) | 0.224 g (2.5 mol %) | 24 mL 1,2-dichlorobenzene |
| 1u | 150 | 2.086 g (0.021 mol) | 6.114 g (0.031 mol) | 0.211 g (2.5 mol %) | 24 mL 1,1,2,2-tetrachloroethane |
| 1v | | 2.086 g (0.021 mol) | 6.114 g (0.031 mol) | 0.211 g (2.5 mol %) | 24 mL 1,2-dichlorobenzene |
| 1w | 200 | 1.657 g (0.017 mol) | 6.561 g (0.033 mol) | 0.204 g (2.5 mol %) | 24 mL 1,1,2,2-tetrachloroethane |
| 1x | | 1.657 g (0.017 mol) | 6.561 g (0.033 mol) | 0.204 g (2.5 mol %) | 24 mL 1,2-dichlorobenzene |

Example 2: Synthesis of Homopolymer of Glycidyl Methacrylate Poly(GMA) by Solution Polymerization To a 250 ml double walled cylindrical glass reactor, equipped with a mechanical stirrer and thermostat, 20 g GMA, 2 mol % AIBN, 20 mL methyl ethyl ketone were added and reaction mixture was stirred at 70° C. for 5 h. The solution was poured in methanol to precipitate the polymer, and precipitated polymer solution was filtered, and polymer obtained was dried in oven under reduced pressure at 60° C. for 8 h. Synthesis of homopolymer of glycidyl methacrylate poly(GMA) by solution polymerization method is shown in FIG. 13, scheme 3. The 10 wt % solution of poly(GMA) is prepared by addition to a 100 mL stopper conical flask, 5 g poly(GMA) and 50 mL 1,4-dioxane and solution was kept for 2 days for polymer dissolution.

Figure 14:
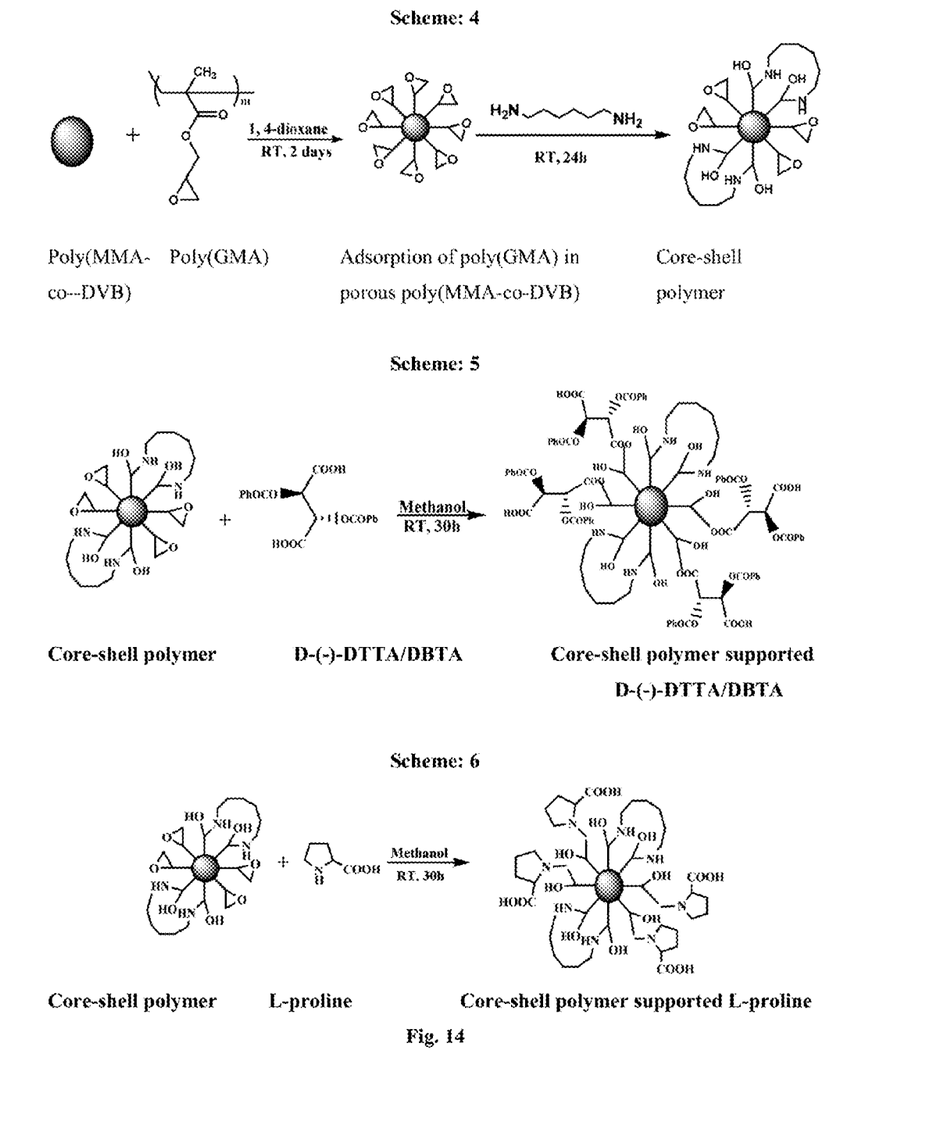
FIG. 14 depicts Scheme: 4 showing synthesis of core-shell type polymer; Scheme: 5 showing synthesis of D-(−)-ditoluoyl (-Ph-CH$_3$)/D-(−)-dibenzoyl tartaric acid (-Ph) functionalized polymer; and Scheme: 6 showing synthesis of L-proline functionalized polymer.

Example 3: Physical Adsorption of Poly(GMA) on Poly(MMA-co-DVB) on Crosslinked Core Copolymer To a 100 mL stopper flask, 10 g, MDD-200, crosslinked polymer beads were weighed in a stopper conical flask to which 20 mL of 5 g poly(GMA) dissolved in 50 mL 1,4-dioxane solution was added and kept for 24 h at room temperature (25° C.). Polymer was dried in oven under reduced pressure at 70° C. for 8 h to obtain an epoxy coated polymer on the porous crosslinked polymer. The epoxy content was determined by titrimetric method using HCl-dioxane system. The epoxy content was 2.4855 mmol/g. Synthesis of core-shell polymer using poly(GMA) as shell on crosslinked poly(MMA-co-DVB) as core is depicted in FIG. 14, scheme 4. Surface area of polymer after adsoption of poly(GMA) was 410.5 m2/g.

Example 4: Crosslinking of Homopolymer Poly(GMA) with 1,6-Hexamethylenediamine as Crosslinker Weighed 7.0 g of core-shell type of polymer and 1,6-hexamethylenediamine solution in methanol were added to crosslink with the 5 mol % epoxy functionality of poly (GMA). Because of 5% crosslink of homopolymer epoxy group makes the homopolymer insoluble in the organic solvents. This reaction mixture was kept for 30 h at room temperature to react amino groups with epoxy functionality. Crosslinked poly(GMA) was dried in oven under reduced pressure at 60° C. for 8 h. Molecular weight of synthesized poly(GMA) by solution polymerization was 24,600 g/mol.

Example 5: Modification of Epoxy Group with Chiral Selector D-(−)-Ditoluoyl Tartaric Acid Crosslinked core-shell copolymer (5 g) was taken in a stopper conical flask to which 5.4735 g (14.17 mmol) of D-(−)-ditoluoyl tartaric acid dissolved in 10 mL methanol was added and the reaction flak was kept at ambient temperature for a period of 48 h. On completion of the reaction time the modified polymer was washed several times with methanol and filtered. The polymer was dried under reduced pressure at 60° C. for 8 h. The acid content of D-(−)-ditoluoyl tartaric acid was 1.6128 mol/g. Synthesis of core-shell polymer supported chiral selector prepared from D-(−)-ditoluoyl/dibenzoyl tartaric acid and L-proline is depicted in FIG. 14, scheme 5 and respectively. Recipe of chiral selector to drug ratio is presented in Table 5. Surface area of polymer after DTTA chiral selector reaction with core-shell polymer was 195.3 m2/g.

TABLE 5

| Chiral selector | chiral selector/g (1.0 mmol) | Racemic terbutaline 0.9 mmol (wt. in g) | Racemic terbutaline 0.6 mmol (wt. in g) | Racemic salbutamol 0.9 mmol (wt. in g) |
|---|---|---|---|---|
| D-(−)-ditoluoyl tartaric acid | 1.61 | 1.45 (0.3270) | 0.97 (0.2180) | 1.45 (0.3474) |
| L-proline | 1.43 | 1.29 (0.2907) | 0.86 (0.1938) | 1.29 (0.3087) |
| D-(−)-dibenzoyl tartaric acid | 1.70 | — | | 1.53 (0.5489) |

Example 6: Modification of Epoxy Group with Chiral Selector D-(−)-Dibenzoyl Tartaric Acid Crosslinked core-shell copolymer (5 g) was taken in a stopper conical flask to which 5.0.76 g. (14.17 mmol) of D-(−)-dibenzoyl tartaric acid dissolved in 10 mL methanol was added and the reaction flak was kept at ambient temperature for a period of 48 h. On completion of the reaction time the modified polymer was washed several times with methanol and filtered. The polymer was dried under reduced pressure at 60° C. for 8 h. The acid content of D-(−)-dibenzoyl tartaric acid was 1.7024 mmol/g. Surface area of polymer after DBTA chiral selector reaction with core-shell polymer was 261.9 $m^2/g$.

Example 7: Modification of Epoxy Group with Chiral Selector L-Proline

Crosslinked core-shell copolymer (5 g) was taken in a stopper conical flask to which 1.6311 g (14.17 mmol) of L-proline dissolved in 10 mL methanol was added and the reaction flak was kept at ambient temperature for a period of 48 h. On completion of the reaction time the modified polymer is washed several times with methanol and filtered. The polymer was dried under reduced pressure at 60° C. for 8 h. The acid content of L-proline acid was 1.436 mmol/g. Surface area of core-shell polymer after reaction with L-proline was 199.9 $m^2/g$.

Example 8: Resolution of (±)-Terbutaline (1:0.6)

Core-shell polymer with chiral selector D-(−)-ditoluoyl tartaric acid were tested for its efficiency for resolution of racemic drugs. Chiral selector D-(−)-ditoluoyl tartaric acid, 1.613 mmol/g, containing polymer was taken in a stopper conical flask to which 0.967 mmol (0.218 g) of racemic drug terbutaline dissolved in 7 mL methanol, was added. The enantiomeric excess of the drug at different time intervals was analyzed using high performance liquid chromatography.

Example 9: Resolution of (±)-Terbutaline (1:0.9)

Core-shell polymer with chiral selector D-(−)-ditoluoyl tartaric acid were tested for its efficiency for resolution of racemic drugs. Chiral selector D-(−)-ditoluoyl tartaric acid, 1.613 mmol/g, containing polymer was taken in a stopper conical flask to which 1.452 mmol (0.3270 g) of racemic drug terbutaline dissolved in 7 mL methanol, was added. The enantiomeric excess of the drug at different time intervals was analyzed using high performance liquid chromatography.

Example 10: Resolution of (±)-Terbutaline (1:0.6)

Core-shell polymer with chiral selector L-proline was tested for its efficiency for resolution of racemic drugs. Chiral selector L-proline, 1.4335 mmol/g, containing polymer was taken in a stopper conical flask to which 0.860 mmol (0.1938 g) of racemic drug terbutaline dissolved in 7 mL methanol, was added. The enantiomeric excess of the drug at different time intervals was analyzed using high performance liquid chromatography.

Example 11: Resolution of (±)-Terbutaline (1:0.9)

Core-shell polymers with chiral selector L-proline were tested for its efficiency for resolution of racemic drugs. Chiral selector L-proline, 1.4335 mmol/g, containing polymer was taken in a stoppered conical flask to which 1.290 mmol (0.2907 g) of racemic drug terbutaline dissolved in 7 mL methanol, was added. The enantiomeric excess of the drug at different time intervals was analyzed using high performance liquid chromatography. Resolution analysis of (±)-terbutaline using polymer supported D-(−)-ditoluoyl tartaric acid and L-proline is illustrated in Tables 6.

TABLE 6

| Time | D-(−)-ditoluoyl tartaric acid | | L-proline | |
| --- | --- | --- | --- | --- |
| (h) | ee* (%) | ee** (%) | ee* (%) | ee** (%) |
| 0 | 0 | 0 | 0.0 | 0.0 |
| 2 | 7.08 | 9.52 | 9.66 | 11.12 |
| 6 | 8.86 | 8.29 | 8.92 | 10.86 |
| 12 | 9.85 | 8.87 | 21.08 | 14.50 |
| 24 | 29.79 | 26.21 | 41.87 | 23.10 |

*= Chiral selector:drug ratio (1:0.9)
**= Chiral selector:drug ratio (1:0.6)

Example 12: Resolution of (±)-Salbutamol (1:0.9)

Core-shell polymer with chiral selector D-(−)-ditoluoyl tartaric acid was tested for its efficiency for resolution of racemic drugs. Chiral selector D-(−)-ditoluoyl tartaric acid, 1.6130 mmol/g, containing polymer was taken in a stopper conical flask to which 1.45 mmol (0.3474 g) of racemic drug salbutamol dissolved in 7 mL methanol, was added. The enantiomeric excess of the drug at different time intervals was analyzed using high performance liquid chromatography.

Example 13: Resolution of (±)-Salbutamol (1:0.9)

Core-shell polymer with chiral selector L-proline was tested for its efficiency for resolution of racemic drugs. Chiral selector, L-proline, 1.4335 mmol/g, containing polymer was taken in a stopper conical flask to which 1.2901 mmol (0.3087 g) of racemic drug salbutamol dissolved in 7 mL methanol, was added. The enantiomeric excess of the drug at different time intervals was analyzed using high performance liquid chromatography.

Example 14: Resolution of (±)-Salbutamol (1:0.9)

Core-shell polymer with chiral selector D-(−)-benzoyl tartaric acid was tested for its efficiency for resolution of racemic drugs. Chiral selector D-(−)-dibenzoyl tartaric acid, 1.70 mmol/g, polymer was taken in a stopper conical flask to which 1.53 mmol (0.5489 g) of racemic drug salbutamol dissolved in 7 mL methanol, was added. The enantiomeric excess of the drug at different time intervals was analyzed using high performance liquid chromatography. Resolution analysis of (±)-salbutamol using polymer supported L-proline and D-(−)-ditoluoyl tartaric acid is illustrated in Table 7. Moreover, enantiomer separation of (±)-salbutamol using polymer supported D-(−)-dibenzoyl tartaric acid is reported in Table 7.

TABLE 7

| Time (h) | L-proline ee* (%) | D-(−)-ditoluoyl tartaric acid ee* (%) | D-(−)-dibenzoyl tartaric acid ee* (%) |
|---|---|---|---|
| 0 | 0 | 0 | 0 |
| 2 | 17.11 | 19.32 | 19.69 |
| 6 | 17.45 | 23.05 | 21.95 |
| 12 | 16.82 | 30.20 | 30.30 |
| 24 | 19.91 | 22.12 | 52.13 |

Results and Discussion

Surface Area, Pore Volume, Pore Size of MMA-TDMA and MMA-DVB Copolymers

The effects of several parameters like crosslinker, concentration of crosslinker, type of porogen on the physical properties of polymer were studied. Three types of porogens can be used to generate the surface area and porosity in the polymer. i.e. solvating porogen (SOL), Non-solvating porogen (NONSOL) and polymeric porogen (POLY). Surface area and pore volume varies according to the type of porogen. SOL porogens, for example, toluene, and halogenated porogens generates surface area 50-500 m$^2$/g, and relatively low pore volume (up to 0.8 cc/g). Pore size distribution shown by SOL porogen is micro and mesopores. NONSOL porogen like hydrocarbons and alcohols gives less surface area (10-100 m$^2$/g) compare to SOL, but more pore volume (0.6-2.0 cc/g). Pore size distribution shown by NONSOL is meso and macropores. Polymeric porogen show very small surface area (0.1 to 10 m$^2$/g) with pore volume up to 0.5 cc/g and pore size up to few µm. The results of surface area are tabulated in Table 2 and FIG. 1, while pore volume, pore size and porosity data tabulated in Table 3.

Effect of Crosslinker:

Four different series of MMA monomer using two different crosslinkers (EDMA or DVB) and two different porogens were synthesized. Crosslinking agent is the major parameter that decides the properties like surface area, pore size, pore volume and particle size of polymer. In MMA series, the specific surface area increases with increase in concentration of crosslinker. MMA-DVB shows high specific surface area compare with MMA-EDMA copolymer. This variation in surface area is because of hydrophilicity and hydrophobicity of crosslinker. EDMA is highly hydrophilic and has more affinity towards the aqueous phase, whereas DVB is highly hydrophobic and has more affinity towards the organic phase. This phenomenon creates interfacial tension between aqueous and organic phase. The interfacial tension for MMA-EDMA is lower than for MMA-DVB. This is because of high polar nature of EDMA compare to DVB.

In MED series, surface area increases up to 100% crosslink density, afterwards it decreases. In MET, MDT and MDD series, surface area increases steadily from 25 to 200% crosslink density. MDD series at 200%, crosslink density showed highest surface area, 554.95 m$^2$/g, whereas for MDT, surface area decreases at same crosslink density. DVB gives high surface area compare to EDMA, because of its higher hydrophobicity. In all the four polymer series, pore volume also show the same trend like surface area. In MED and MDD series, pore volume steadily increases with increase in concentration of crosslinker, but MED series show high pore volume compared to MDD. MED show pore volume 1.931 cc/g and MDD shows 1.437 cc/g at 200% crosslink density. In MET series, show high pore volume than MDT series. MET series give maximum pore volume 1.842 cc/g at 150 crosslink density whereas MDT series shows maximum pore volume 1.516 cc/g at 75 crosslink density. In MET series, the maximum pore diameter, 0.062 µm was observed at 50% crosslink density, where as in MDT series, maximum pore diameter, 0.074 µm, was observed at 100% crosslink density. In MED series, the maximum pore diameter, 0.084 µm was observed at 50% crosslink density, where as in MDD series, maximum pore diameter, 0.058 µm, was observed at 75% crosslink density.

There is no particular trend in porosity was observed, but it is in the range of 35-70% in all series. BET used to determine the pore size less than 0.090 µm (fine porosity). This is the limitation of BET method. Mercury Porosimetry used to determine pore size ranges from 300 to 0.0035 µm. (Table 3).

Effect of Porogen:

MMA-DVB copolymer gives high specific surface area and pore volume with 1,2-dichlorobenzene than 1,1,2,2-tetrachloroethane (Table 2 and 4). Maximum surface area was observed MDD series, 554.95 m$^2$/g, at 200% crosslink density, while for MDT series, it is 333.2 m$^2$/g at 200% crosslink density. In case of MMA-EDMA copolymers, maximum surface obtained with 1,2-dichlorobenzene than 1,1,2,2-tetrachloroethane. MET series gives high surface area 253.5 m$^2$/g at 200% crosslink density, whereas MED series gives 121.20 m$^2$/g surface area at 200% crosslink density.

Particle Size Distribution:

Generally, suspension polymerization gives the polymer having particle size varies from $10^4$ to $10^7$ nm. The particle size distribution of poly(MMA-co-EDMA) and poly(MMA-co-DVB) synthesized at 70° C. for 3 h was studied as a function of crosslink density. The average particle size increases as concentration of DVB increases from crosslink density 25 to 200%. The particle size of the copolymer synthesized by suspension polymerization ranges from 15 to 70 µm, MMA-EDMA series gives larger particle size with 1,2-dichlorobenzene than 1,1,2,2-tetrachloroethane porogen. Average particle diameter reported in Table 4 and FIG. 2.

Figure 3:
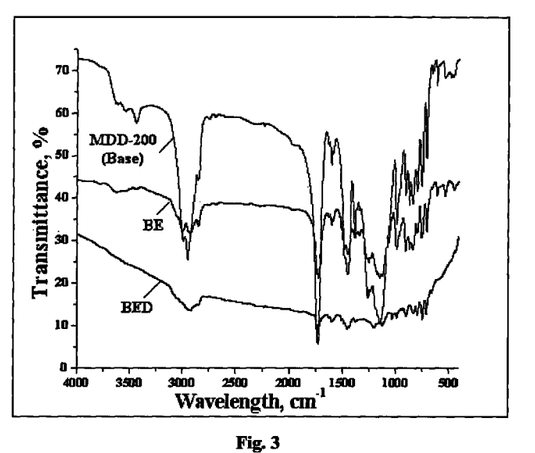
FIG. 3 depicts FTIR spectrum of MDD-200 i.e. Base, MDD-200+poly(GMA) i.e. BE, MDD-200+poly(GMA)+1, 6-hexamethylene diamine i.e. BED or core-shell.
Figure 4:
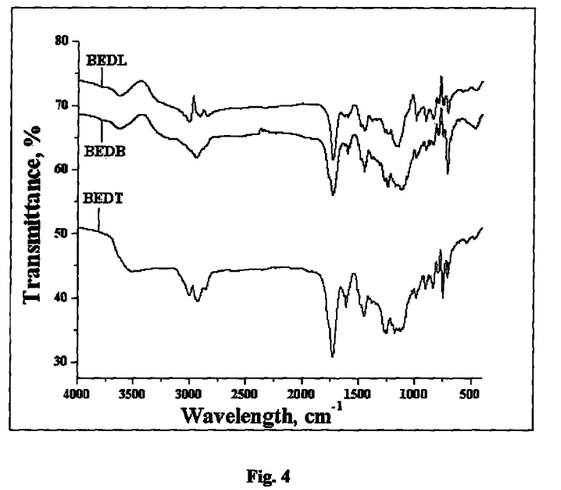
FIG. 4 depicts FTIR spectrum of D-(−)-ditoluoyl tartaric acid functionalized core-shell polymer i.e. BEDT, D-(−)-dibenzoyl tartaric acid functionalized core-shell polymer i.e. BEDB, L-proline functionalized core-shell polymer i.e. BEDL.

Fourier Transform Infra-Red Spectroscopy:

FTIR spectrum shows that the peaks of base polymer (MDD-200) observed at 1731 cm$^{-1}$ presents the presence of —C(O)—C—, ester functionality in the polymer. FTIR spectrum illustrates that the peaks of base polymer (MDD-200+poly(GMA) observed the peaks at 1731 cm$^{-1}$ indicates ester functionality, while 907 and 757 cm$^{-1}$ are related to asymmetric stretch vibration of epoxy C—O bonds. Symmetric and asymmetric stretch vibrations of aliphatic C—H bonds have seen in 2990 to 2854 cm$^{-1}$. FTIR spectrum represents the peaks of base core-shell polymer (MDD-200)+poly(GMA)+1,6-hexamethylenediamine observed at 1729 cm$^{-1}$ indicates ester functionality, and 3539, 794 cm$^{-1}$ indicates presence of N—H and 1199 cm$^{-1}$ shows the presence of C—N stretching, 907 represents the presence of epoxy groups (FIG. 3). FTIR spectrum depicts that the peaks of tartaric acid derivative and L-proline functionalized coreshell polymer observed at 1733 cm$^{-1}$ indicates the presence of —COO—, acid functionality, because of overlapping of acid and ester peaks. The appearance of the bands around 1036, 1382, 1602, 1702 and 1748 cm$^{-1}$ are due to the vibrations CO, RCOO— and RCOOH of the carboxylate functionality. The appearance of the peaks at 3529 cm$^{-1}$ due to the vibrations —COOH of the carboxylate functionality. The peak appears at 1281 cm$^{-1}$ shows the presence of C—N stretching of L-proline functionalized core-shell polymer (FIG. 4).

Figure 5:
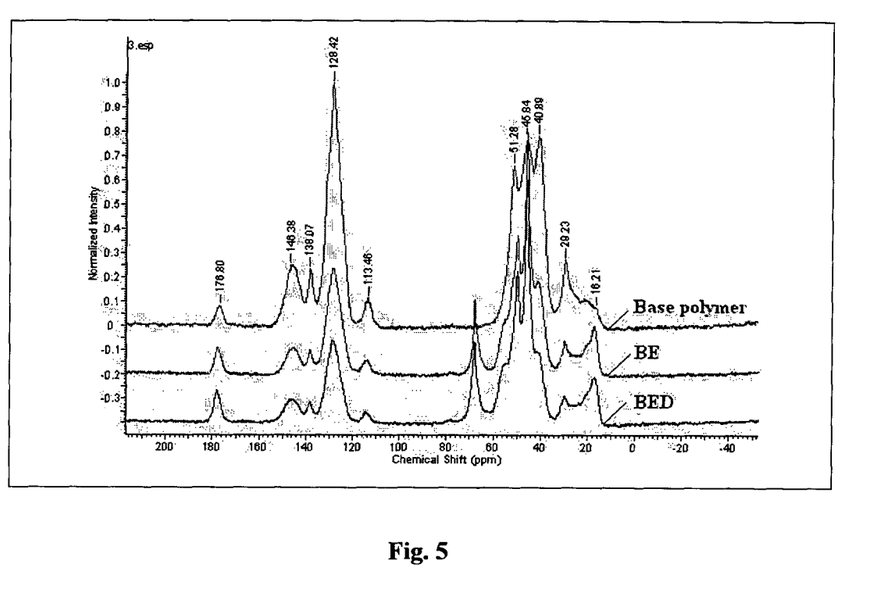
FIG. 5 depicts $^{13}$C NMR spectrum of MDD-200 i.e. Base, MDD-200+poly(GMA) i.e. BE, MDD-200+poly(GMA)+1, 6-hexamethylene diamine i.e. BED or core-shell.
Figure 6:
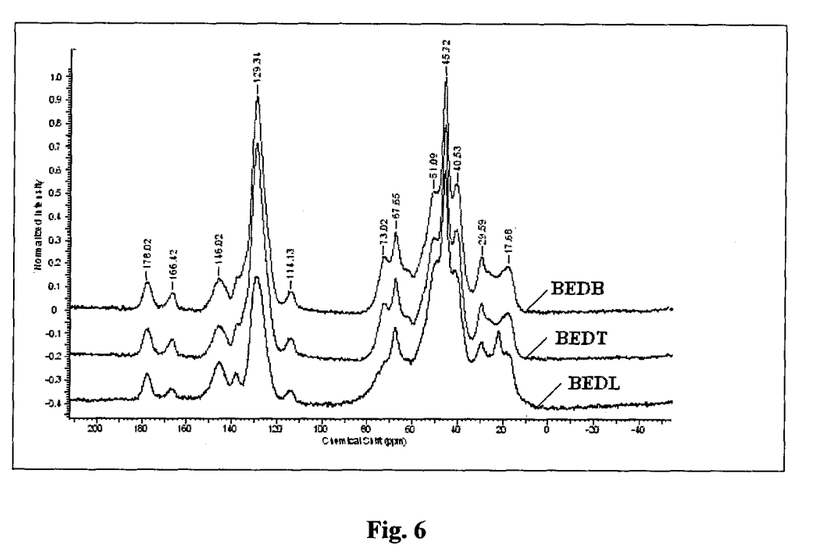
FIG. 6 depicts $^{13}$C NMR spectrum of D-(−)-ditoluoyl tartaric acid functionalized core-shell polymer i.e. BEDT, D-(−)-dibenzoyl tartaric acid functionalized core-shell polymer i.e. BEDB, L-proline functionalized core-shell polymer i.e. BEDL.

$^{13}$C NMR Spectroscopy:

Synthesis of core-shell polymer and its modification were confirmed by FTIR spectroscopy. Moreover, $^{13}$C NMR is also one of the most important tools to confirm polymer synthesis in case of solid/insoluble samples. $^{13}$C solid state NMR of 400 MHz was used for analysis of base, BE, BED, BEDB and BEDL samples. In most cases, $^{13}$C spectra were recorded in adamantane ($C_{10}H_{16}$) as internal standard containing two carbon peaks (29.23, 40.89 ppm). $^{13}$C NMR ($C_{10}H_{16}$, 400 MHz): base (core) polymer, MMA: δ 17.9, 51.28, 145.83, 177.78. DVB: 113.46, 128.42, 138.07. BE: δ 17.01, 67.77. BED: δ 16.95, 67.89. BEDB: δ 67.65, 73.02, 166.42. Furthermore, BEDT also demonstrates the same peak in addition to —CH$_3$ which gets merged into the range of 21-23 ppm of core-shell polymer. BEDL: δ 21.83, 67.95, 166.05. $^{13}$C NMR spectrum of base (core) polymer, BE and BED (core-shell) is represented in FIG. 5, whereas core-shell supported polymer, BEDB and BEDL is represented in FIG. 6.

Figure 7:
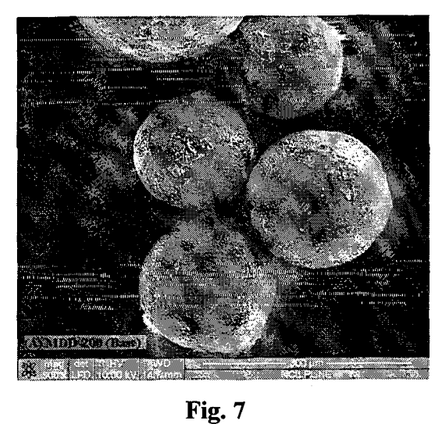
FIG. 7 depicts SEM of MDD-200 (Base polymer).
Figure 8:
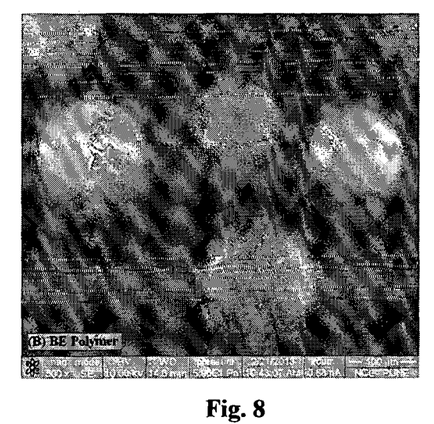
FIG. 8 depicts SEM of MDD-200 poly(GMA).
Figure 9:
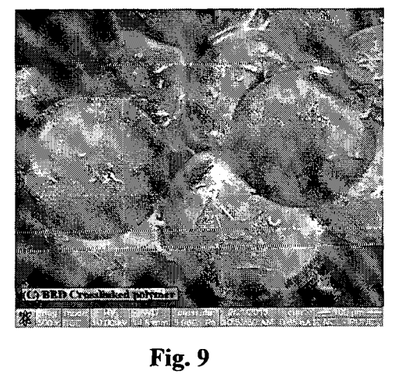
FIG. 9 depicts SEM of MDD-200+poly(GMA)+1,6-hexamethylene diamine.
Figure 10:
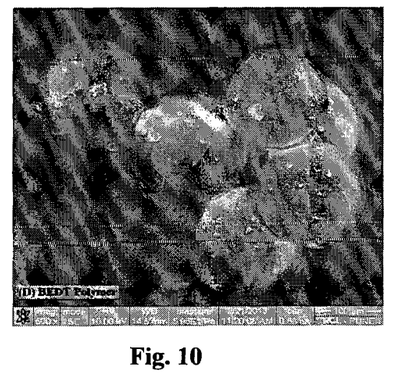
FIG. 10 depicts SEM of D-(−)-ditoluoyl tartaric acid functionalized core-shell polymer.
Figure 11:
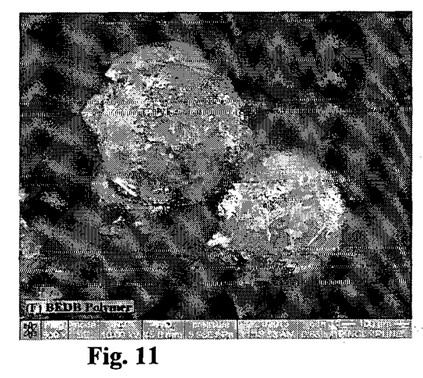
FIG. 11 depicts SEM of D-(−)-dibenzoyl tartaric acid functionalized core-shell polymer.
Figure 12:
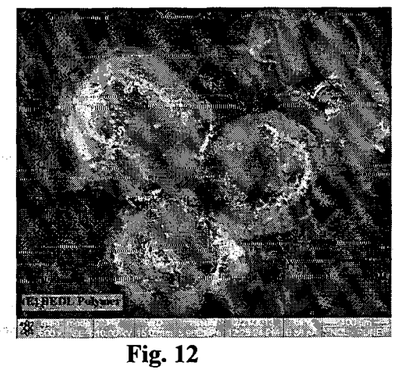
FIG. 12 depicts SEM of L-proline functionalized core-shell polymer.

Scanning Electron Microscopy (SEM):

Scanning electron microscopy (SEM) images of polymer beads of copolymers are presented in FIGS. 7-12 using 500 times magnification. FIG. 7 describes SEM image of core polymer beads prepared from MMA-DVB monomers. It shows the polymer beads are spherical, quite smooth, completely isolated and no agglomeration. FIG. 8 describes SEM image of core polymer beads are coated with poly(GMA), and it clearly shows outer layer of core is covered with poly(GMA), i.e. the morphology of core-shell polymers. FIG. 9 describes SEM image of core-shell polymer beads containing poly(GMA) coating was crosslinked 5% with 1,6-hexamethylene diamine, it clearly shows polymer beads are agglomerated, coupled together. FIGS. 10, 11 and 12 describe SEM images of core-shell polymer beads are reacted with chiral selector, and illustrates polymer beads are conglomerated, coupled together, and are observed in cluster form and covalent binding of chiral selector with core-shell type polymer.

EDX Analysis:

EDX analysis of MMA-DVB copolymer as core, MMA-DVB copolymer coated with poly(GMA) as shell, core-shell polymer crosslinked by 1,6-hexamethylene diamine, and chiral selector modification with D-(−)-ditoluoyl/dibenzoyl tartaric acid, L-proline core-shell polymer are described below. MMA-DVB core polymer showed 76.66 wt % (81.39 at %) carbon, and 23.34 wt % (18.61 at %) of oxygen. The epoxy coated core-shell polymer shows 65.60 wt % (72.24 at %) carbon and 32.91 wt % (27.20 at %) oxygen. Both, above polymers show the presence of carbon and oxygen only, but absence of nitrogen. The core-shell polymer, crosslinked by 1,6-hexamethylene diamine, shows the presence of 78.54 wt % (82.38 at %) carbon, 15.04 wt % (11.84 at %) oxygen and 6.43 wt % (5.78 at %) nitrogen, presence of nitrogen in the core-shell polymer, confirms that the some part of epoxy groups are crosslinked. The two chiral selectors supported polymer, for example, D-(−)-ditoluoyl tartaric acid C-79.29, N-5.45, O-15.27 wt % and D-(−)-dibenzoyl tartaric acid (C-55.61, N-5.32, O-38.30 wt %) shows the decrease in concentration of nitrogen content due to the binding of chiral selectors, while the L-proline (C-80.07, N-8.11, O-11.82 wt %) chiral selector shows increase in concentration of nitrogen because of presence of nitrogen in the chiral selector.

HPLC Analysis:

Present investigation interested the resolution of the racemic drugs using polymer supported various chiral selectors. The resolution of the racemic drugs using polymer supported chiral selector depends on Three Point Interaction Rule. One of the enantiomer make the three point interaction with chiral selector, while opposite enantiomer make the two point interaction with the same chiral selector. Because of this interaction, supported chiral selector makes the transient diastereomer with two isomers of drugs. The transient diastereomer which form two point interaction is less stable and has more solubility compared with transient diastereomer having three point interactions. The resolution process depends on formation of transient diastereomer between racemic terbutaline drugs and polymer supported chiral selector and physical properties like solubility, stability and adsorption characteristics between them. The interaction that created by chiral selector with two enantiomer need not to be covalent. Weaker and non covalent interaction also allowed separating the enantiomer. For small scale resolution, in laboratory the chiral chromatography increasingly used for separation of racemic mixture of drugs. In HPLC, three point interactions between analyte and chiral stationary phase makes the retention time difference in the enantiomer. The isomer which form three attractive interactions, have longer retention time, while the opposite isomer has two attractive and one repulsive interaction show shorter retention. There are two main approaches for chiral HPLC analysis, direct and indirect. In direct method, transient diastereomer formed while in indirect method, covalent diastereomeric complex formed between drug and chiral selector. Transient diastereomer formed by interaction of racemic mixture and chirally pure compound, but covalent diastereomeric complex formed by derivatizing of enantiomer of the drug with chirally pure reagent.

Core-shell type of polymers was synthesized to get more reactive sites on the polymer surface. Furthermore, recipe of chiral selector to drug ratios are reported in Table 5. Three chiral selectors were selected for resolution of racemic drugs, for example, D-(−)-ditoluoyl tartaric acid, L-proline, and D-(−)-dibenzoyl tartaric acid. These polymer supported chiral selectors were used to resolve the different racemic drugs, for example, (±)-terbutaline, (±)-salbutamol. The ratios of chiral selector to drug were 1:0.9 and 1:0.6 mmol. If the racemic mixture of drugs (terbutaline or salbutamol sulphate) allowed to interact with polymer supported chiral selector i.e. D-(−)-ditoluoyl/dibenzoyl tartaric acid and L-proline, it shows the enantiomeric excess of one of the enantiomer (Table 6-10). Mobile phase used for the resolution of racemic terbutaline was MeOH:ACN:AA:TEA (93:7:0.045:0.055). In present resolution study, salbutamol and terbutaline has R enantiomer that elutes first followed by S isomer.

HPLC conditions used for enantiomer separation of terbutaline are as follows:

Chiral Selector: L-proline and D-(−)-ditoluoyl tartaric acid

Drug: (±) terbutaline

Chiral selector: Drug ratio=1:0.9, and 1:0.6 mol

Column: Chirobiotic T (Teicoplanin)

Mobile phase (v/v): MeOH: ACN: AA: TEA (93:7:0.045:0.055)

Flow rate: 1 mL/min; Wavelength: 270 nm

HPLC conditions used for enantiomer separation of salbutamol sulphate are as follow:

Chiral Selector: L-proline and D-(−)-ditoluoyl tartaric acid, D-(−)-dibenzoyl tartaric acid Drug: (±) Salbutamol sulphate Chiral selector: Drug ratio=1:0.9 mol Column: Chirobiotic T (Teicoplanin)

Mobile phase (v/v): MeOH: ACN: AA: TEA (93:7:0.045: 0.055)

Flow rate: 1 mL/min; Wavelength: 270 nm.

ADVANTAGES OF THE INVENTION a. Specialty applications exist for the use of such core-shell polymer beads in the areas of separation of enantiomers from racemic mixtures, analysis of blood samples, water purification, high performance liquid chromatography, and the like.

b. Core-shell polymer beads with chiral group surface functionalization with hydrophobic characteristics have unique applications such as analysis of human plasma, the proteins in the blood plasma are denatured on the hydrophobic surface of the beads.

c. In contrast, a column packed with core-shell polymer beads having a hydrophobic core and a hydrophilic shell does not suffer from the same problems because the hydrophilic surface does not react with blood protein.

d. These type core-shell polymer beads with chiral surface functionality are also useful in separation of enantiomers from racemic mixtures, identification of optically active compounds and preparation of optically active compounds.

We claim:

1. A core-shell functionalized polymer comprising:
   i. a core comprising a crosslinked copolymer made from monomers, said monomers selected from vinyl cyanide, vinylidene cyanide, non-aromatic acrylate, ethylene dimethacrylate and divinylbenzene;
   ii. a shell, comprising a polymer made from monomers selected from glycidyl ethers of methacrylate; and
   iii. a chiral selector selected from tartaric acid derivatives and amino acids.

2. The core-shell functionalized polymer as claimed in claim 1, wherein the proportion of shell polymer is 5 to 90% by weight based on the total amount of the monomers of the core copolymer.

3. The core-shell functionalized polymer as claimed in claim 1, wherein the core comprises crosslinked copolymers selected from poly(MMA-co-DVB) and poly(MMA-co-EDMA).

4. The core-shell functionalized polymer as claimed in claim 1, wherein glycidyl ethers of methacrylate is glycidyl methacrylate.

5. The core-shell functionalized polymer as claimed in claim 1, wherein the core-shell functionalized polymer is in the form of beads.

6. The core-shell functionalized polymer as claimed in claim 1, wherein chiral selectors are selected D-(−)-ditoluoyl tartaric acid and D-(−)-dibenzoyl tartaric acid and amino acid is L-proline.

7. The core-shell functionalized polymer as claimed in claim 1, wherein said polymer is useful for the separation or resolution of enantiomers of racemic mixtures by using high performance liquid chromatography.

8. The core-shell functionalized polymer as claimed in claim 7, wherein the racemic mixture is a drug racemic mixture selected from β2-adrenergic receptor agonist drugs.

9. The core-shell functionalized polymer of claim 8, wherein the β2-adrenergic receptor agonist drugs are selected from (±)-terbutaline and (±)-salbutamol.

10. The core-shell functionalized polymer as claimed in claim 1, wherein efficiency of chiral selectors is in the range of 20 to 70% in the period of 2 to 50 h.

11. The core-shell functionalized polymer of claim 1, wherein the non-aromatic acrylate is selected from ethyl acrylate, propyl acrylate, butyl acrylate, cyclohexyl acrylate, 2-ethyl hexyl acrylate, methyl acrylate, methyl methacrylate, and butyl methacrylate.

12. The core-shell functionalized polymer of claim 1, wherein vinyl cyanide or vinylidene cyanide is selected from acrylonitrile and methacrylonitrile.

13. A process for the preparation of core-shell functionalized polymer as claimed in claim 1, comprising the steps of:
   a) providing porous crosslinked copolymer, wherein the crosslinked copolymer is made from monomers selected from vinyl cyanide, vinylidene cyanide, non-aromatic acrylate, ethylene dimethacrylate and divinylbenzene;
   b) providing linear polymer containing oxiranyl groups, wherein the linear polymer is made from monomers selected from glycidyl ethers of methacrylate;
   c) adding the crosslinked copolymer of step a) with the linear polymer of step b) in a ratio ranging between 0.3 to 0.7 wt % at a temperature in the range of 20 to 40° C. for a period in the range of 10 to 20 min followed by drying at a temperature in the range of 50 to 80° C. for a period in the range of 6 to 10 h to obtain epoxy coated polymer;
   d) crosslinking partially the oxiranyl groups present on the epoxy coated polymer of step c) with amine groups by adding crosslinker 1,6-hexamethylene diamine with the linear polymer containing oxiranyl groups in a ratio range of 3 to 7 mol % at a temperature in the range of 20 to 40° C. for a period in the range of 10 to 20 min followed by drying at a temperature in the range of 40 to 80° C. for a period in the range of 6 to 10 hours to obtain core-shell polymer; and
   e) modifying epoxy groups of the polymer product of step d) with 1 to 2 mmol/g chiral tartaric acid derivatives or L-proline derivatives to obtain core-shell functionalized polymer.

14. The process of claim 13, wherein the non-aromatic acrylate is selected from ethyl acrylate, propyl acrylate, butyl acrylate, cyclohexyl acrylate, 2-ethyl hexyl acrylate, methyl acrylate, methyl methacrylate, and butyl methacrylate.

15. The process of claim 13, wherein vinyl cyanide or vinylidene cyanide is selected from acrylonitrile and methacrylonitrile.

* * * * *